(12) United States Patent
Fu et al.

(10) Patent No.: US 9,847,847 B2
(45) Date of Patent: Dec. 19, 2017

(54) METHOD AND DEVICE FOR MANAGING OPTICAL CHANNEL OVERHEAD AND OPTICAL SIGNAL RECEIVING NODE

(71) Applicant: ZTE Corporation, Shenzhen (CN)

(72) Inventors: Xihua Fu, Shenzhen (CN); Xinling Zhang, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 170 days.

(21) Appl. No.: 14/768,246

(22) PCT Filed: Feb. 7, 2014

(86) PCT No.: PCT/CN2014/071886
§ 371 (c)(1),
(2) Date: Aug. 17, 2015

(87) PCT Pub. No.: WO2014/124587
PCT Pub. Date: Aug. 21, 2014

(65) Prior Publication Data
US 2016/0006534 A1   Jan. 7, 2016

(30) Foreign Application Priority Data

Feb. 17, 2013  (CN) .......................... 2013 1 0051861

(51) Int. Cl.
*H04J 14/02*   (2006.01)
*H04Q 11/00*   (2006.01)
(Continued)

(52) U.S. Cl.
CPC .......... *H04J 14/0239* (2013.01); *H04B 10/25* (2013.01); *H04J 3/1652* (2013.01);
(Continued)

(58) Field of Classification Search
None
See application file for complete search history.

(56) References Cited

U.S. PATENT DOCUMENTS

| 7,068,685 | B1 * | 6/2006 | Sihvola | ................. H04J 3/0608 370/474 |
| 2007/0211750 | A1 * | 9/2007 | Li | .......................... H04L 12/24 370/445 |

(Continued)

FOREIGN PATENT DOCUMENTS

| CN | 101039245 A | 9/2007 |
| CN | 101247200 A | 8/2008 |

(Continued)

OTHER PUBLICATIONS

International Search Report for corresponding application PCT/CN2014/071886 filed Feb. 7, 2014; dated Jun. 10, 2014.
(Continued)

*Primary Examiner* — Charles C Jiang
*Assistant Examiner* — George Atkins, Jr.
(74) *Attorney, Agent, or Firm* — Cantor Colburn LLP (57) ABSTRACT

Disclosed are a method and device for managing optical channel overhead, and an optical signal receiving node. The method comprises: optical channel overhead information is structured, wherein the optical channel overhead information comprises at least one of the following: the optical channel nominal central frequency, the optical channel application code, and the optical channel trail trace identifier; and the optical channel overhead information is sent to the optical signal receiving node. The disclosure solves the technical problem in the related art of an inability to negotiate a single, unified optical channel nominal central frequency and application code between the optical transmitter and the optical receiver, i.e. the disclosure enables an optical transmitter and the optical receiver to negotiate such the
(Continued)

nominal central frequency and application code, thereby achieving the technical result of an optical signal being correctly sent and received.

19 Claims, 3 Drawing Sheets

(51) Int. Cl.
    *H04B 10/25* (2013.01)
    *H04J 3/16* (2006.01)

(52) U.S. Cl.
    CPC .......... *H04J 14/02* (2013.01); *H04J 14/0273* (2013.01); *H04Q 11/0003* (2013.01); *H04Q 11/0066* (2013.01); *H04Q 2011/0086* (2013.01)

(56) References Cited

U.S. PATENT DOCUMENTS

| | | | | |
|---|---|---|---|---|
| 2011/0318004 | A1* | 12/2011 | Bruno | H04Q 11/0062 398/45 |
| 2012/0106956 | A1* | 5/2012 | Rao | H04J 3/12 398/52 |
| 2013/0121685 | A1* | 5/2013 | Rao | H04J 14/0212 398/17 |
| 2014/0328587 | A1* | 11/2014 | Magri | H04L 45/62 398/26 |
| 2015/0334004 | A1* | 11/2015 | Hussain | H04L 45/22 398/5 |
| 2016/0056886 | A1* | 2/2016 | Kitamura | H04Q 11/0062 398/5 |
| 2016/0323661 | A1* | 11/2016 | Wu | H04Q 11/00 |

FOREIGN PATENT DOCUMENTS

| | | |
|---|---|---|
| CN | 101489157 A | 7/2009 |
| CN | 102870434 A | 1/2013 |
| EP | 2854417 A1 | 4/2015 |
| JP | 2012165110 A | 8/2012 |

OTHER PUBLICATIONS

"Interfaces for the Optical Transport Network (OTN)" ITU-T Standard, International Telecommunication Union; Feb. 13, 2012; No. G.709/Y.1331; p. 1; XP017577719.

Supplemental European Search Report dated Jan. 26, 2016 re: Appicatoin No. PCT/CN2014/071886; pp. 1-7; citing: CN 102 870 434 A, EP 2 854 417 A1, ITU-T "Interfaces for the Optical . . . ", Xihua "Inverse multiplexing . . . ".

Xihua Fu ZTE Corporation "Inverse multiplexing for ODUS; C 1992 Rev. 1"; ITU-T Draft; International Telecommunication Union, Study Period 2009-2012; Aug. 27, 2012; vol. 6/15, 9/15, 11/15, 12/15 and 14/15; pp. 1-5; XP017576411.

* cited by examiner

METHOD AND DEVICE FOR MANAGING OPTICAL CHANNEL OVERHEAD AND OPTICAL SIGNAL RECEIVING NODE

TECHNICAL FIELD

The disclosure relates to the field of communications, and including a method and device for managing optical channel overhead, and an optical signal receiving node.

BACKGROUND

Optical transmission technology has a development trend toward higher single-channel speed (e.g., single-channel 400 G/1 T transmission), higher spectral efficiency, and high order modulation formats. Thus, the most clear and important direction in the development of optical transmission is still to further increase the speed. High-speed transmission faces many restrictions, mainly in two aspects: on one aspect, the optical transmission technology evolves to high spectral efficiency aggregation transmission and high speed service interface transmission, so that if the spectral efficiency cannot be further improved, it makes little sense to perform low-speed aggregation and then high-speed transmission, however, since there may be still Ethernet interfaces on the client sides, the problem of high-speed interface transmission will still be considered, and 400 G will be a critical point of the spectral efficiency limit; on the other aspect, the optical transmission technology evolves to long distance (long cross segment and multi-cross segment), so that although the Optical Signal Noise Ratio (OSNR) of system can be improved by technical means, such as using low-loss optical fiber and low-noise amplifier and reducing cross segment distance, the improvements caused by these technical means are too limited to make a significant breakthrough, and it is also difficult to implement in engineering.

With the growing requirement on the bandwidth of bearer network, the technology beyond 100G is a solution for satisfying the requirement of bandwidth increases. However, for the transmission bandwidth beyond 100G, whether it is 400G or 1T, the traditional 50 GHz Fixed Grid Wavelength Division Multiplexing (WDM) cannot provide enough spectral width to realize the technology beyond 100G. On account of the defect of fixed grid, it is required to propose wider Flexible Grid.

In the related arts, the requirements on channel width are different due to the multi-speed mixed transmission beyond 100 G and the flexibility of modulation format beyond 100 G, and if each channel is customized with an appropriate bandwidth, the system bandwidth can be utilized sufficiently, so that a flexible grid system is generated. Based on the requirement on high-speed WDM system due to the growing increases of bandwidth requirement, it is required to introduce Flexible Grid technology. However, there are many problems to be solved, e.g., how to effectively perform frequency spectrum planning and management, and the compatibility with existing systems.

G698.x defines a Black Link Standard to define characteristics of optical layers of single optical channel between an optical transmitter and an optical domain and between the optical domain and a receiver. The G698.x standard defines physical signal features and application codes of S (sending) reference points and R (receiving) reference points. The application code defines the modulation format and FEC (Forward Error Correction) of a transmitter or receiver. Interfaces corresponding to the S reference points and R reference points defined by G698.x are not defined in G709, and there is no Optical Transport Network (OTN) interfaces which are compatible with the S reference points and R reference points, and more importantly, there is no independent Optical Supervisory Channel (OSC) between the transmitter and the optical domain and between the optical domain and the receiver. Thus, out-of-band optical channel overhead cannot be provided for the optical channel between the transmitter and the optical domain and between the optical domain and the receiver. However, inside the optical domain, the optical supervisory channel can be used to carry optical channel overhead and optical multiplex section overhead and optical regeneration section overhead to provide the optical network management capability. The optical channel overhead (OCh-Overhead) is generally carried in an OSC, wherein the OSC, an optical channel payload (OCh-Payload), the optical multiplex section and the optical regeneration section are transported in the same optical fiber. However, there is no specification in the G709 standard to specify a Protocol Data Unit (PDU) format carrying the optical channel overhead at present.

The transmitter of the current customer interface uses a tunable laser, and a tunable optical receiver will be used in the future, that is, the transmitter and the receiver may dynamically adjust central frequency according to a configured Nominal Central Frequency (NCF) and an application code (e.g., modulation format, and FEC) to transmit or receive optical signals. For the extra flexibility, it is required to negotiate a single, unified NCF and application code between the optical receiver and the optical transmitter, so that the optical signals can be correctly sent and received. Meanwhile, it is also required to negotiate a unified NCF and an application code between two ends of the S (sending) reference points and R (receiving) reference points, so that the optical domain may flexibly configure the receiver and transmitter according to the negotiated NCF and the negotiated application code.

However, for the problem of how to implement the negotiated unified NCF and the negotiated application code, no effective solution has been proposed in the related art, thus the optical signal could hardly be correctly sent and received.

Aiming at the above-mentioned problem, no effective solution has been proposed.

SUMMARY

A method for managing optical channel overhead is provided in the embodiment of the disclosure, so as to at least solve the technical problem in the related art that how to negotiate a single, unified NCF and application code between the optical transmitter and the optical receiver.

According to one aspect of the embodiments of the disclosure, a method for managing optical channel overhead, comprising: structuring optical channel overhead information, wherein the optical channel overhead information comprises at least one of the following information: an optical channel nominal central frequency, an optical channel application code, and an optical channel trail trace identifier; and sending the optical channel overhead information to an optical signal receiving node.

In an example embodiment, one Optical Data Unit 4 n (ODUCn) or one Optical Data Unit 4 n Administrative Group (OTUCnAG) is inversely multiplexed onto one or more optical channels, wherein the one or more optical channels, onto which the same ODUCn or the same OTUC-nAG is inversely multiplexed, correspond to the same optical channel trail trace identifier and correspond to different optical channel nominal central frequencies; and/or the one or more optical channels, onto which different ODUCns or different OTUCnAGs are inversely multiplexed, correspond to different channel trail trace identifiers and correspond to different optical channel nominal central frequencies, and a speed of the ODUCn and a speed of the OTUCnAG are both n*100 Gbit/s, where n is a positive integer.

In an example embodiment, the optical channel application code is used for indicating a modulation format and/or a Forward Error Correction (FEC) which are/is used by a Frequency Slot (FS) corresponding to each optical channel.

In an example embodiment, after the optical signal receiving node receives the optical channel overhead information, the method further comprises: comparing, by the optical signal receiving node, the optical channel trail trace identifier in the optical channel overhead information with an optical channel trail trace identifier in in-band overhead information associated with each optical channel respectively; and when there are one or more optical channels of which optical channel trail trace identifiers in the in-band overhead information are unequal to the received optical channel trail trace identifier, generating an Optical Channel Trace Identifier Mismatch defect (OCh dTIM) alarm for the one or more optical channels.

In an example embodiment, after the optical signal receiving node compares the optical channel overhead information with the in-band overhead information associated with each optical channel, the method further comprises: for one or more optical channels of which the optical channel trail trace identifiers in the in-band overhead information are equal to the received optical channel trail trace identifier, comparing the optical channel nominal central frequency in the received optical channel overhead information with an optical channel nominal central frequency in the in-band overhead information associated with each of the one or more optical channels; and when the optical channel nominal central frequency in the received optical channel overhead information is unequal to the optical channel nominal central frequency in the in-band overhead information associated with each of the one or more optical channels, generating an Optical Channel Trace Identifier Mismatch defect (OCh dTIM) alarm for the one or more optical channels.

In an example embodiment, structuring the optical channel overhead information comprises: encapsulating the optical channel overhead information in a Protocol Data Unit (PDU); and sending the optical channel overhead information to the optical signal receiving node comprises: sending the PDU to the optical signal receiving node through a data communication network.

In an example embodiment, sending the optical channel overhead information to the optical signal receiving node comprises: in a case where there is an optical supervisory channel between a transmitter and a receiver, sending the optical channel overhead information to the optical signal receiving node through the optical supervisory channel.

In an example embodiment, the optical channel overhead information further comprises Optical Channel Payload Forwarding Defect Indication (OCh-PFDI), Optical Channel Open Connection Indication (OCh-OCI), and/or Optical Channel Overhead Forwarding Defect Indication (OCh-OFDI).

According to another aspect of the disclosure, a device for managing optical channel overhead, comprising: a structuring element, configured to structure optical channel overhead information, wherein the optical channel overhead information comprises at least one of the following: an optical channel nominal central frequency, an optical channel application code, and an optical channel trail trace identifier; and a sending element, configured to send the optical channel overhead information to an optical signal receiving node.

In an example embodiment, the structuring element comprises: an encapsulating component, configured to encapsulate the optical channel overhead information in a Protocol Data Unit (PDU); and the sending element comprises: a first sending component, configured to send the PDU to the optical signal receiving node through a data communication network.

In an example embodiment, the sending element comprises: a second sending component, configured to, in a case where there is an optical supervisory channel between a transmitter and a receiver, send the optical channel overhead information to the optical signal receiving node through the optical supervisory channel.

In an example embodiment, the optical channel overhead information further comprises Optical Channel Payload Forwarding Defect Indication (OCh-PFDI), Optical Channel Open Connection Indication (OCh-OCI), and/or Optical Channel Overhead Forwarding Defect Indication (OCh-OFDI).

According to the other aspect of the disclosure, an optical signal receiving node, comprising: a receiving element, configured to receive optical channel overhead information, wherein the optical channel overhead information comprises at least one of the following: an optical channel nominal central frequency, an optical channel application code, and an optical channel trail trace identifier.

In an example embodiment, the optical signal receiving node further comprises: a first comparing element, configured to, after receiving the optical channel overhead information, compare the optical channel trail trace identifier in the optical channel overhead information with an optical channel trail trace identifier in in-band overhead information associated with each optical channel respectively; and a first alarming element, configured to, in a case where it is determined that there are one or more optical channels of which optical channel trail trace identifiers in the in-band overhead information are unequal to the received optical channel trail trace identifier, generate an Optical Channel Trace Identifier Mismatch defect (OCh dTIM) alarm for the one or more optical channels.

In an example embodiment, the optical signal receiving node further comprising: a second comparing element, configured to, after the optical signal receiving node compares the optical channel overhead information with the in-band overhead information associated with each optical channel, for one or more optical channels of which the optical channel trail trace identifiers in the in-band overhead information are equal to the received optical channel trail trace identifier, compare the optical channel nominal central frequency in the received optical channel overhead information with an optical channel nominal central frequency in the in-band overhead information associated with each of the one or more optical channels; and a second alarming element, configured to, when the optical channel nominal central frequency in the received optical channel overhead information is unequal to the optical channel nominal central frequency in the in-band overhead information associated with each of the one or more optical channels, generate an Optical Channel Trace Identifier Mismatch defect (OCh dTIM) alarm for the one or more optical channels.

In an example embodiment, the optical channel overhead information further comprises Optical Channel Payload Forwarding Defect Indication (OCh-PFDI), Optical Channel Open Connection Indication (OCh-OCI), and/or Optical Channel Overhead Forwarding Defect Indication (OCh-OFDI).

In this embodiment of the disclosure, the optical channel nominal central frequency, the optical channel application code and the optical channel trail trace identifier are carried in the optical channel overhead information, so that it is solved the technical problem in the related art of how to negotiate the single, unified NCF and application code between the optical transmitter and the receiver, i.e. to enable the optical transmitter and the optical receiver to negotiate the single, unified NCF and application code, thereby achieving the technical result of an optical signal being correctly sent and received.

DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DESCRIPTION OF THE EMBODIMENTS

The disclosure is described below in detail by reference to the accompanying drawings in conjunction with embodiments. It should be noted that the embodiments and the characteristics of the embodiments can be combined with each other if no conflict is caused.

Figure 1:
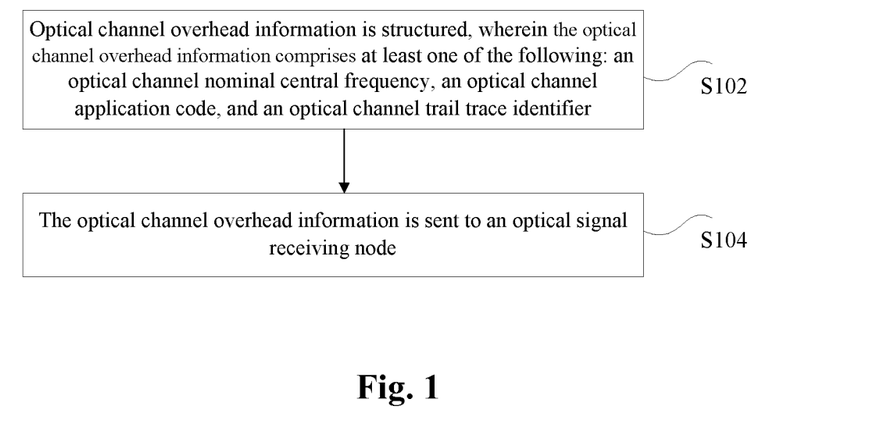
FIG. 1 shows an example flowchart of a method for managing optical channel overhead according to an embodiment of the disclosure.

A method for managing optical channel overhead is provided in the embodiment of the disclosure. As shown in FIG. 1, the method comprises the following steps:

S102: Optical channel overhead information is structured, wherein the optical channel overhead information comprises at least one of the following: an optical channel nominal central frequency, an optical channel application code, and an optical channel trail trace identifier; and S104: The optical channel overhead information is sent to an optical signal receiving node.

In an optional example, the above steps S102 and S104 may be executed by an optical signal sending node, i.e., the optical signal sending node structures optical channel overhead information and sends the structured optical channel overhead information to the optical signal receiving node.

In the example embodiment, the optical channel overhead information comprises the optical channel nominal central frequency, the optical channel application code and the optical channel trail trace identifier, so that it is solved the technical problem in the related art that it is an inability to negotiate a single, unified NCF and application code between the optical transmitter and the optical receiver, so as to enable to negotiate the NCF and application code between the optical transmitter and the optical receiver, thereby achieving the technical result of an optical signal being correctly sent and received.

In an example embodiment, one Optical Data Unit 4n (ODUCn, with a frame structure of 4*3824*n, 4 rows, and 3824*n columns, where n is a positive integer) or one ODUCnAG is inversely multiplexed onto one or more optical channels, wherein the one or more optical channels, onto which the same ODUCn or the same ODUCnAG is inversely multiplexed, correspond to the same optical channel trail trace identifier and correspond to different optical channel nominal central frequencies, and/or the one or more optical channels, onto which different ODUCns or ODUCnAGs are inversely multiplexed, correspond to different channel trail trace identifiers and correspond to different optical channel nominal central frequencies.

In an example embodiment, the optical channel application code may be used for indicating a modulation format and/or a FEC which are used by each optical channel with a corresponding frequency sequence.

For realizing a misconnection detection, determination can be made according to the optical channel trail trace identifier in the optical channel overhead information. In an example embodiment, after the optical signal receiving node receives the optical channel overhead information, the above method further comprises: the optical signal receiving node compares respectively the optical channel trail trace identifier in the optical channel overhead information with each optical channel trail trace identifier in the in-band overhead information associated with each optical channel; and when there are one or more optical channels of which the optical channel trail trace identifiers in the in-band overhead information are unequal to the received optical channel trail trace identifier, a defect alarm is generated, wherein the defect alarm is used for indicating that optical channel trace identifiers of the one or more optical channels are mismatched.

After determining according to the optical channel trail trace identifier, further determination is made according to the optical channel nominal central frequency, so as to realize the effective detection of misconnection. In an example embodiment, after the optical signal receiving node compares the optical channel overhead information with each in-band overhead information associated with the each optical channel respectively, the method further comprises: for one or more optical channels of which optical channel trail trace identifiers in the in-band overhead information of each of the one or more optical channels are equal to the received optical channel trail trace identifier, the optical channel nominal central frequency in the optical channel overhead information is compared with an optical channel nominal central frequency in the in-band overhead information associated with each of the one or more optical channels respectively; and when the optical channel nominal central frequency in the received optical channel overhead information is unequal to the optical channel nominal central frequency in the in-band overhead information associated with each of the one or more optical channels, a defect is generated, wherein the defect alarm is used for indicating that optical channel trace identifiers of the one or more optical channels are mismatched.

In a practical application, the optical supervisory channel is provided in some cases, and is not provided in some other cases, which are described below:

1) In the absence of optical supervisory channel, the optical channel overhead information can be encapsulated in a PDU and then sent through a Data Communication Network (DCN): In an optional embodiment, structuring the optical channel overhead information comprises: the optical channel overhead information is encapsulated in a PDU; and sending the optical channel overhead information to the optical signal receiving node comprises: the PDU is sent to the optical signal receiving node through a data communication network.

2) In the case that an optical supervisory channel is provided between the transmitter and the receiver, the optical channel overhead information is sent to the optical signal receiving node through the optical supervisory channel.

The above optical channel overhead information further comprises an original optical channel overhead message, such as (OCh-PFDI), OCh OCI, and OCh-O FDI.

Figure 2:
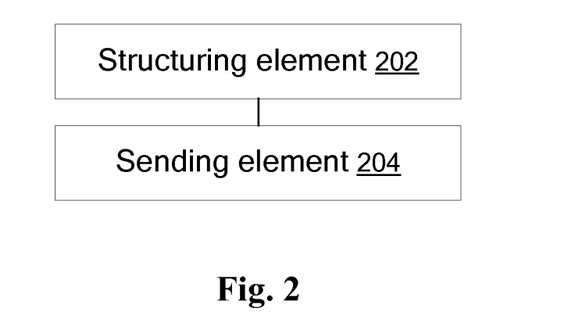
FIG. 2 shows an optional structure diagram of a device for managing optical channel overhead according to an embodiment of the disclosure.

In this embodiment, a device for managing optical channel overhead is provided in the embodiment of the disclosure, which is used for implementing the above embodiments and optional embodiments, which has been described and will not be explained here. As used below, the term "element" or "component" is a combination of software and/or hardware capable of implementing predetermined functions. Although the device described in the following embodiment may be preferably implemented by a software, it would be conceived to implement hardware or a combination of software and hardware. FIG. 2 shows an optional structure diagram of a device for managing the optical channel overhead according to an embodiment of the disclosure, as shown in FIG. 2, the device comprises: an structuring element 202 and a sending element 204. The structure will be described below.

1) The structuring element 202 is configured to structure optical channel overhead information, wherein the optical channel overhead information comprises at least one of the following: an optical channel nominal central frequency, an optical channel application code, and an optical channel trail trace identifier; and 2) The sending element 204 is coupled to the structuring element 202 and configured to send the optical channel overhead information to an optical signal receiving node.

Figure 3:
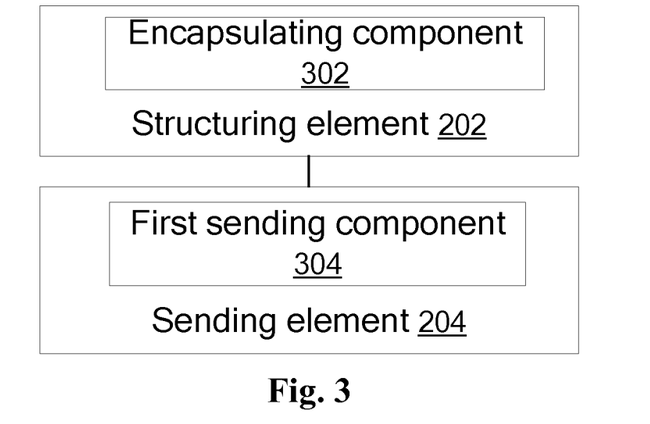
FIG. 3 shows another optional structure diagram of the device for managing the optical channel overhead according to an embodiment of the disclosure.

In an example embodiment, as shown in FIG. 3, the structuring element 202 comprises: an encapsulating component 302 which is configured to encapsulate the optical channel overhead information in a PDU; and the sending element 204 comprises: a first sending component 304 which is configured to send the PDU to the optical signal receiving node through a data communication network.

In an example embodiment, the sending element comprises: a second sending component which is configured to, in the case where there is an optical supervisory channel between a transmitter and a receiver, send the optical channel overhead information to the optical signal receiving node through the optical supervisory channel.

In this embodiment, an optical signal receiving node is provided, wherein the optical signal receiving node comprises: a receiving element which is configured to receive optical channel overhead information, wherein the optical channel overhead information comprises at least one of the following: an optical channel nominal central frequency, an optical channel application code, and an optical channel trail trace identifier.

In an example embodiment, the optical signal receiving node further comprises: a first comparing element which is configured to, after receiving the optical channel overhead information, compare the optical channel trail trace identifier in the optical channel overhead information with an optical channel trail trace identifier in the in-band overhead information associated with each optical channel respectively; and a first alarming element which is configured to, in the case where it is determined that there are one or more optical channel trail trace identifiers in the in-band overhead information are unequal to the received optical channel trail trace identifier, generate a defect alarm used for indicating that optical channel trace identifiers of the one or more optical channels are mismatched.

In an example embodiment, the optical signal receiving node further comprises: a second comparing element which is configured to, after the optical signal receiving node compares the optical channel overhead information with the in-band overhead information associated with optical channels, for the one or more optical channels, wherein an optical channel trail trace identifier in the in-band overhead information of each of the one or more optical channels is equal to the received optical channel trail trace identifier, compare the optical channel nominal central frequency in the received optical channel overhead information with an optical channel nominal central frequency in the in-band overhead information associated with each of the one or more optical channels; and a second alarming element which is configured to, when the optical channel nominal central frequency in the received optical channel overhead information is unequal to the optical channel nominal central frequency in the in-band overhead information associated with each of the one or more optical channels, generate a defect alarm used for indicating that optical channel trace identifiers of the one or more optical channels are mismatched.

The method for managing the optical channel overhead will be further described below with reference to specific embodiments, so as to solve the problem of how to effectively perform spectrum management after introducing flexible grid technology and tunable laser.

Figure 4:
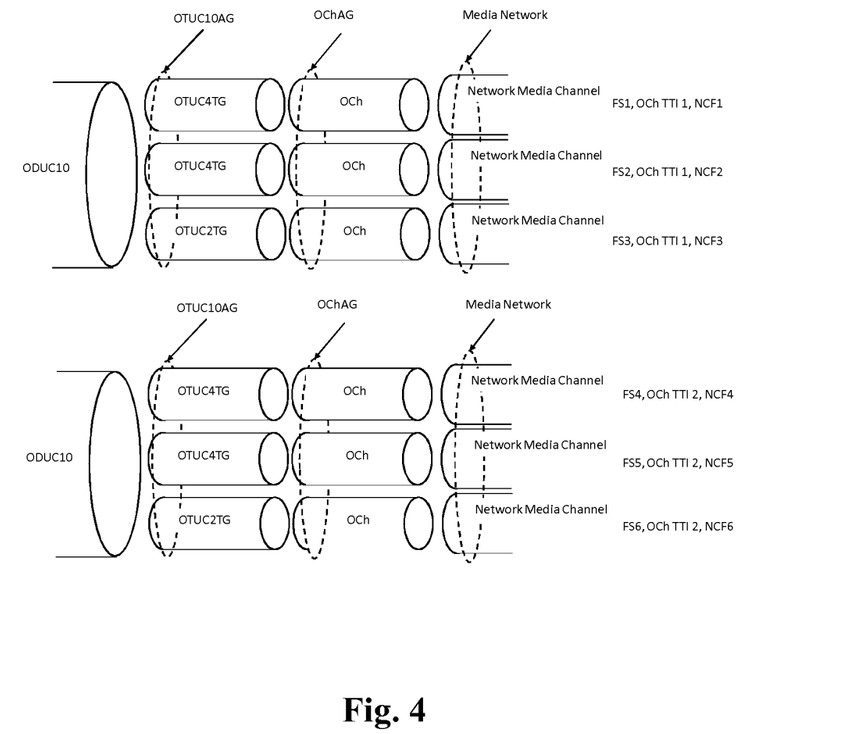
FIG. 4 shows an example schematic diagram of overhead information contained in optical channel overhead according to an embodiment of the disclosure.

As shown in FIG. 4, in a network beyond 100G, one ODUC10 container may be inversely multiplexed onto three transport groups of the optical transport unit (OTUCmTG, where 1=<m<=10), including two OTUC4TGs (400 Gbit/s) and one OTUC2TG (200 Gbit/s), and after the two OTUC4TGs and one OTUC2TG are converted into optical signals, three Frequency Slots (FSs), including FS 1 (for transport of 400 Gbit/s), FS 2 (for transport of 200 Gbit/s) and FS 3 (for transport of 400 Gbit/s), are emitted through an optical transmitter; and another ODUC10 container is also inversely multiplexed on the three transport groups of optical transport units (OTUCmTG, where 1=<m<=10), including two OTUC4TGs and one OTUC2TG, and after the two OTUC4TGs and one OTUC2TG are converted into optical signals, three Frequency Slots (FSs), including FS 4 (for transport of 400 Gbit/s), FS 5 (for transport of 200 Gbit/s) and FS 6 (for transport of 400 Gbit/s), are emitted through an optical transmitter. For realizing a misconnection detection, it is required to allocate different OCh TTIs for different OChAGs, wherein the OCh in each of group OChAG is uniquely identified by the corresponding nominal central frequency. Therefore, two ODUCns are inversely multiplexed onto three optical channels, so that for each OCh in a first OChAG (Administrative Group), the OCh TTIs in the OCh-O overhead information must be equal, e.g., being OCh TTI 1, and each OCh is uniquely identified by the NC). For example, as shown in FIG. 4, FS1, FS2 and FS3 are indicated by NCF1, NCF2 and NCF3, respectively. However, in another OChAG, for each OCh in the OChAG (Administrative Group), the OCh TTI in the in-band overhead information must be unequal to the OCh TTI in the first group, e.g., being OCh TTI 2; and each OCh is uniquely identified by NCF. As shown in FIG. 4, FS4, FS5 and FS6 are indicated by NCF4, NCF5 and NCF6, respectively.

Based on the network beyond 100 G as shown in FIG. 4, the two cases according to whether there is an optical supervisory channel between a optical transmitter and a optical receiver are described below.

Example Embodiment 1

When there is no optical supervisory channel between the optical transmitter and the optical receiver, how to transport optical channel overhead information between the optical transmitter and the optical receiver, so as to solve the problem that, after the tunable optical transmitter and receiver are used, it is required to negotiate a single, unified NCF and application code (e.g., modulation format, and FEC) between the optical receiver and the optical transmitter to enable an optical signal to be correctly sent and received.

In the example embodiment, the optical channel overhead information, includes NCF and application code, which are carried in DCN. The optical channel overhead information is encapsulated together with the original optical channel overhead information into a PDU, wherein the original optical channel overhead information includes: OCh-PFDI, OCh OCI (OCh-OFDI), etc., the PDU is transmitted between the optical transmitter and the optical receiver through a data communication network. Since the optical channel overhead information cannot be transported through the optical supervisory channel, and is transported through the data communication network, it is still required to carry OCh TTI in the PDU to ensure that the above overhead information (OCh-P FDI, OCh OCI, OCh NCF, OCh Application Code, OCh-O FDI) are matched with the corresponding optical channels.

Figure 5:
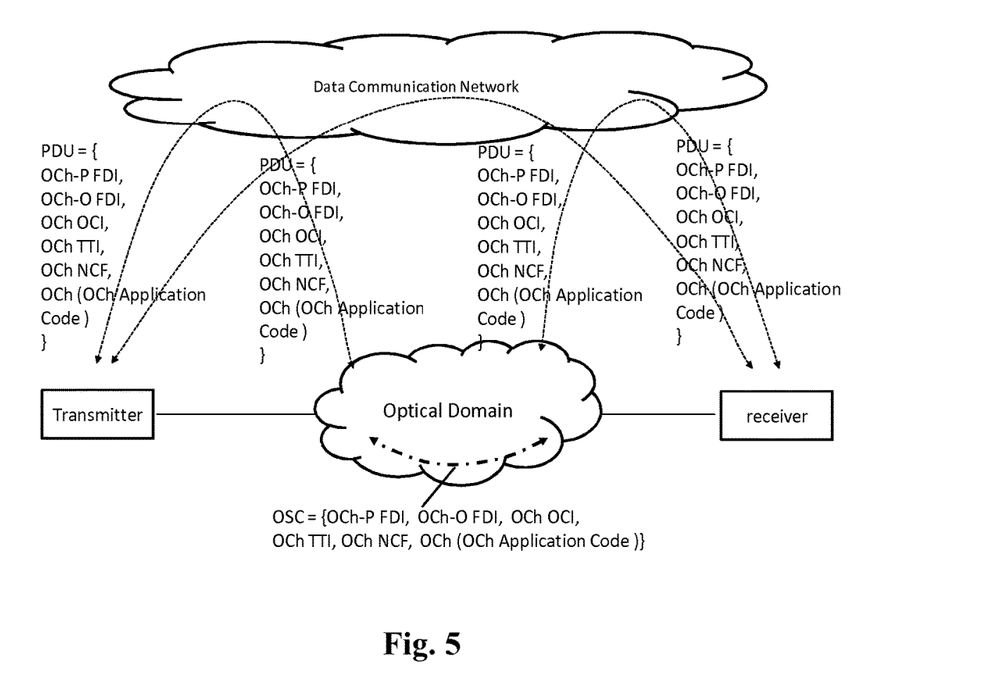
FIG. 5 shows an example schematic diagram of optical channel overhead information transferring through a data communication network in the absence of OSC.

As shown in FIG. 5, the optical transmitter is connected to the optical domain through the data communication network, and the optical transmitter and the optical domain encapsulate the optical channel overhead information, including OCh TTI, OCh NCF (OCh-PFDI) (OCh-OFDI), OCh OCI, and OCh Application Code, into a PDU, the PDU is transmitted between the optical transmitter and the optical domain through the data communication network, and the PDU carrying the above information may be borne in transport channels, such as an Internet Protocol (IP) channel, an Ethernet channel, an MPLS-TP (connection-oriented packet-switch network technology) channel, etc.

The optical receiver is connected to the optical domain through a data communication network, and the optical receiver and the optical domain encapsulate the optical channel overhead information, including OCh TTI, OCh NCF, OCh-P FDI (OCh-OFDI), OCh OCI, and OCh Application Code, into a PDU, the PDU is transmitted between the optical domain and the optical receiver through a data communication network, and the PDU carrying the information may be borne in the channels such as the IP channel, the Ethernet channel, the MPLS-TP channel, etc.

In summary, the optical receiver is connected to the optical transmitter through the data communication network, and the optical receiver and the optical domain encapsulate the optical channel overhead information, including OCh TTI, OCh NCF (OCh-PFDI) (OCh-OFDI), OCh OCI, and OCh Application Code, into the PDU, and the PDU is transmitted between the optical transmitter and the optical receiver through the data communication network, and the PDU carrying the above information is borne in the channels such as the IP channel, the Ethernet channel, the MPLS-TP channel, etc.

Example Embodiment 2

In the example embodiment, an example for extending the optical channel overhead of the optical transport network, so as to at least solve the problem that, after the tunable optical transmitter and the tunable optical receiver are used, it is required to negotiate a single, unified NCF and application code (e.g., modulation format, and FEC) between the optical receiver and the optical transmitter to enable the optical signal to be correctly sent and received.

In the case that an optical supervisory channel is provided between the optical transmitter and the optical receiver, it is required to transport information between the optical transmitter and the optical receiver through OSC, wherein as compared with the original OCh-O overhead information, the information additionally includes OCh TTI, NCF and application code, so as to negotiate a single, unified NCF and application code between the optical receiver and the optical transmitter.

Thus, when the 6 frequency slots as shown in FIG. 4 arrive at the same optical signal receiving node, in order to realize a misconnection detection, it is required to allocate different OCh-TTIs for each OChAG group, wherein the OCh-P in each group OChAG is uniquely identified by a corresponding nominal central frequency. Thus, two ODUCns are inversely multiplexed onto three optical channels, so that the OCh TTIs in the OCh-O overhead information corresponding to the OChs in the first OChAG (Administrative Group) must be equal, e.g., being OCh TTI 1, and each OCh is uniquely identified by the nominal central frequency, e.g., FS1, FS2 and FS3 are indicated by NCF1, NCF2 and NCF3, respectively. However, in another OChAG, for each OCh in the OChAG, the OCh TTI in the in-band overhead information must be unequal to the OCh TTI in the first group, e.g., being OCh TTI 2, and each OCh is uniquely identified by the nominal central frequency, as shown in FIG. 4, FS4, FS5 and FS6 are indicated by NCF4, NCF5 and NCF6.

The above overhead information carried by OSC may be used for detecting misconnection, e.g., after the node receives OCh-TTI overhead information and nominal central frequency transferred from the optical supervisory channel or through DCN, comparing the OCh-TTI overhead information and the nominal central frequency with the in-band overhead information, including the OCh-P TTI and the NCF, associated with the optical channels. When the OCh TTI in the in-band overhead information of a certain optical channel is unequal to the OCh TTI transferred from the optical supervisory channel or through DCN, an Optical Channel Trace Identifier Mismatch defect (OCh dTIM) alarm is generated to indicated that a misconnection occurs to generate an OCh dTIM alarm for the one or more optical channels.

When the OCh TTI in the in-band overhead information of a certain optical channel is equal to the value of the OCh TTI transferred from the optical supervisory channel or through DCN, it is required to further compare whether the OCh NCF of the in-band overhead information associated with the optical channel is equal to the OCh NCF of the optical channel transferred from the optical supervisory channel or through DCN or not, when the OCh NCF of the in-band overhead information associated with the optical channel is unequal to the OCh NCF of the optical channel transferred from the optical supervisory channel or through DCN, an Optical Channel Trace Identifier Mismatch defect (OCh dTIM) alarm is generated to indicated that a misconnection occurs to generate an OCh dTIM alarm for the one or more optical channels.

It should be noted that the processing for mismatch detection in the example embodiment 2 may also be applied to the example embodiment 1.

It can be seen from the above description that the disclosure implements the following technical effect: the optical channel overhead information comprises the optical channel nominal central frequency, the optical channel application code and the optical channel trail trace identifier, so as to solve the technical problem in the related art of an inability to negotiate the single, unified NCF and application code between the optical transmitter and the optical receiver, i.e. to enable the optical transmitter and the receiver to negotiate such the NCF and application code, thereby achieving the technical result of an optical signal being correctly sent and received.

Obviously, a person skilled in the art would understand that the above components and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit component respectively, or a plurality of components or steps thereof are made into one integrated circuit component. Thus, the disclosure is not limited to any particular combination of hardware and software.

The above description is only preferred embodiments of the disclosure and is not intended to limit the disclosure, and the disclosure can have a variety of changes and modifications for ordinary person skilled in the field. Any modification, equivalent replacement, or improvement made without departing from the principle of the disclosure should fall within the protection scope of the disclosure.

INDUSTRIAL APPLICABILITY

The optical channel overhead information comprises the optical channel nominal central frequency, the optical channel application code and the optical channel trail trace identifier, so as to resolve the defect in the related art of an inability to negotiate the single, unified NCF and application code between the optical transmitter and the optical receiver, i.e. to enable the optical transmitter and the optical receiver to negotiate such the NCF and application code, thereby achieving the technical result of an optical signal being correctly sent and received.

The invention claimed is:

1. A method for managing optical channel overhead, comprising:
   structuring optical channel overhead information, wherein the optical channel overhead information comprises at least one of the following information: an optical channel nominal central frequency, an optical channel application code, and an optical channel trail trace identifier, wherein one Optical Data Unit 4 n (ODUCn) or one Optical Data Unit 4 n Administrative Group (OTUCnAG) is inversely multiplexed onto one or more optical channels, wherein the ODUCn refers to a frame structure of 4*3824*n, the frame structure comprises 4 rows and 3824*n columns, where n is a positive integer, the one or more optical channels, onto which the same ODUCn or the same OTUCnAG is inversely multiplexed, correspond to the same optical channel trail trace identifier and correspond to different optical channel nominal central frequencies; and/or the one or more optical channels, onto which different ODUCns or different OTUCnAGs are inversely multiplexed, correspond to different channel trail trace identifiers and correspond to different optical channel nominal central frequencies, and a speed of the ODUCn and a speed of the OTUCnAG are both n*100 Gbit/s; and
   sending the optical channel overhead information to an optical signal receiving node.

2. The method according to claim 1, wherein structuring the optical channel overhead information comprises:
   encapsulating the optical channel overhead information in a Protocol Data Unit (PDU); and
   sending the optical channel overhead information to the optical signal receiving node comprises: sending the PDU to the optical signal receiving node through a data communication network.

3. The method according to claim 1, wherein the optical channel application code is used for indicating a modulation format and/or a Forward Error Correction (FEC) which are/is used by a Frequency Slot (FS) corresponding to each optical channel.

4. The method according to claim 3, wherein
   structuring the optical channel overhead information comprises: encapsulating the optical channel overhead information in a Protocol Data Unit (PDU); and
   sending the optical channel overhead information to the optical signal receiving node comprises: sending the PDU to the optical signal receiving node through a data communication network.

5. The method according to claim 1, wherein after the optical signal receiving node receives the optical channel overhead information, the method further comprises:
   comparing, by the optical signal receiving node, the optical channel trail trace identifier in the optical channel overhead information with an optical channel trail trace identifier in in-band overhead information associated with each optical channel respectively; and
   when there are one or more optical channels of which optical channel trail trace identifiers in the in-band overhead information are unequal to the received optical channel trail trace identifier, generating an Optical Channel Trace Identifier Mismatch defect (OCh dTIM) alarm for the one or more optical channels.

6. The method according to claim 5, wherein after the optical signal receiving node compares the optical channel overhead information with the in-band overhead information associated with each optical channel, the method further comprises:
   for one or more optical channels of which the optical channel trail trace identifiers in the in-band overhead information are equal to the received optical channel trail trace identifier, comparing the optical channel nominal central frequency in the received optical channel overhead information with an optical channel nominal central frequency in the in-band overhead information associated with each of the one or more optical channels; and
   when the optical channel nominal central frequency in the received optical channel overhead information is unequal to the optical channel nominal central frequency in the in-band overhead information associated with each of the one or more optical channels, generating an Optical Channel Trace Identifier Mismatch defect (OCh dTIM) alarm for the one or more optical channels.

7. The method according to claim 6, wherein structuring the optical channel overhead information comprises:
encapsulating the optical channel overhead information in a Protocol Data Unit (PDU); and
sending the optical channel overhead information to the optical signal receiving node comprises: sending the PDU to the optical signal receiving node through a data communication network.

8. The method according to claim 5, wherein
structuring the optical channel overhead information comprises: encapsulating the optical channel overhead information in a Protocol Data Unit (PDU); and
sending the optical channel overhead information to the optical signal receiving node comprises: sending the PDU to the optical signal receiving node through a data communication network.

9. The method according to claim 1, wherein structuring the optical channel overhead information comprises:
encapsulating the optical channel overhead information in a Protocol Data Unit (PDU); and
sending the optical channel overhead information to the optical signal receiving node comprises: sending the PDU to the optical signal receiving node through a data communication network.

10. The method according to claim 1, wherein sending the optical channel overhead information to the optical signal receiving node comprises:
in a case where there is an optical supervisory channel between a transmitter and a receiver, sending the optical channel overhead information to the optical signal receiving node through the optical supervisory channel.

11. The method according to claim 1, wherein the optical channel overhead information further comprises Optical Channel Payload Forwarding Defect Indication (OCh-P FDI), Optical Channel Open Connection Indication (OCh-OCI), and/or Optical Channel Overhead Forwarding Defect Indication (OCh-O FDI).

12. A device for managing optical channel overhead, comprising a hardware processor and a memory, and the hardware processor is configured to execute program elements stored on the memory, the program elements comprises:
a structuring element, configured to structure optical channel overhead information, wherein the optical channel overhead information comprises at least one of the following: an optical channel nominal central frequency, an optical channel application code, and an optical channel trail trace identifier, wherein one Optical Data Unit 4 n (ODUCn) or one Optical Data Unit 4 n Administrative Group (OTUCnAG) is inversely multiplexed onto one or more optical channels, wherein the ODUCn refers to a frame structure of 4*3824*n, the frame structure comprises 4 rows and 3824*n columns, where n is a positive integer, the one or more optical channels, onto which the same ODUCn or the same OTUCnAG is inversely multiplexed, correspond to the same optical channel trail trace identifier and correspond to different optical channel nominal central frequencies; and/or the one or more optical channels, onto which different ODUCns or different OTUCnAGs are inversely multiplexed, correspond to different channel trail trace identifiers and correspond to different optical channel nominal central frequencies, and a speed of the ODUCn and a speed of the OTUCnAG are both n*100 Gbit/s; and
a sending element, configured to send the optical channel overhead information to an optical signal receiving node.

13. The device according to claim 12, wherein
the structuring element comprises: an encapsulating component, configured to encapsulate the optical channel overhead information in a Protocol Data Unit (PDU); and
the sending element comprises: a first sending component, configured to send the PDU to the optical signal receiving node through a data communication network.

14. The device according to claim 12, wherein the sending element comprises: a second sending component, configured to, in a case where there is an optical supervisory channel between a transmitter and a receiver, send the optical channel overhead information to the optical signal receiving node through the optical supervisory channel.

15. The device according to claim 12, wherein the optical channel overhead information further comprises Optical Channel Payload Forwarding Defect Indication (OCh-P FDI), Optical Channel Open Connection Indication (OCh-OCI), and/or Optical Channel Overhead Forwarding Defect Indication (OCh-O FDI).

16. An optical signal receiving node, comprising a hardware processor and a memory, and the hardware processor is configured to execute program elements stored on the memory, the program elements comprises:
a receiving element, configured to receive optical channel overhead information, wherein the optical channel overhead information comprises at least one of the following: an optical channel nominal central frequency, an optical channel application code, and an optical channel trail trace identifier, wherein one Optical Data Unit 4 n (ODUCn) or one Optical Data Unit 4 n Administrative Group (OTUCnAG) is inversely multiplexed onto one or more optical channels, wherein the ODUCn refers to a frame structure of 4*3824*n, the frame structure comprises 4 rows and 3824*n columns, where n is a positive integer, the one or more optical channels, onto which the same ODUCn or the same OTUCnAG is inversely multiplexed, correspond to the same optical channel trail trace identifier and correspond to different optical channel nominal central frequencies, and/or the one or more optical channels, onto which different ODUCns or different OTUCnAGs are inversely multiplexed, correspond to different channel trail trace identifiers and correspond to different optical channel nominal central frequencies, and a speed of the ODUCn and a speed of the OTUCnAG are both n*100 Gbit/s.

17. The optical signal receiving node according to claim 16, the optical signal receiving node further comprises:
a first comparing element, configured to, after receiving the optical channel overhead information, compare the optical channel trail trace identifier in the optical channel overhead information with an optical channel trail trace identifier in in-band overhead information associated with each optical channel respectively; and
a first alarming element, configured to, in a case where it is determined that there are one or more optical channels of which optical channel trail trace identifiers in the in-band overhead information are unequal to the received optical channel trail trace identifier, generate an Optical Channel Trace Identifier Mismatch defect (OCh dTIM) alarm for the one or more optical channels.

18. The optical signal receiving node according to claim 16, the optical signal receiving node further comprising:
a second comparing element, configured to, after the optical signal receiving node compares the optical channel overhead information with the in-band overhead information associated with each optical channel, for one or more optical channels of which the optical channel trail trace identifiers in the in-band overhead information are equal to the received optical channel trail trace identifier, compare the optical channel nominal central frequency in the received optical channel overhead information with an optical channel nominal central frequency in the in-band overhead information associated with each of the one or more optical channels; and
a second alarming element, configured to, when the optical channel nominal central frequency in the received optical channel overhead information is unequal to the optical channel nominal central frequency in the in-band overhead information associated with each of the one or more optical channels, generate an Optical Channel Trace Identifier Mismatch defect (OCh dTIM) alarm for the one or more optical channels.

19. The optical signal receiving node according to claim 16, wherein the optical channel overhead information further comprises Optical Channel Payload Forwarding Defect Indication (OCh-PFDI), Optical Channel Open Connection Indication (OCh-OCI), and/or Optical Channel Overhead Forwarding Defect Indication (OCh-OFDI).

* * * * *